United States Patent

Ebert et al.

[11] Patent Number: 5,407,966
[45] Date of Patent: Apr. 18, 1995

[54] RECYCLABLE THERMOPLASTIC FOAM WITH A HIGH GLASS TRANSITION TEMPERATURE II

[75] Inventors: Wolfgang Ebert; Wolfgang Beer; Burkhard Köhler, all of Krefeld; Jürgen Kirsch, Leverkusen; Rolf Dhein; Klaus Horn, both of Krefeld, all of Germany

[73] Assignee: Bayer Aktiengesellschaft, Leverkusen, Germany

[21] Appl. No.: 105,829

[22] Filed: Aug. 12, 1993

[30] Foreign Application Priority Data

Aug. 19, 1992 [DE] Germany .......... 42 27 370.6

[51] Int. Cl.⁶ ............................. C08J 9/08
[52] U.S. Cl. ............... 521/97; 521/180; 521/182; 521/189
[58] Field of Search ............ 521/97, 180, 189, 182

[56] References Cited

U.S. PATENT DOCUMENTS

| | | | |
|---|---|---|---|
| 3,277,029 | 10/1966 | Chadwick et al. | 260/2.5 |
| 3,688,985 | 9/1972 | Engel | 521/83 |
| 4,572,740 | 2/1986 | Kretzschmann et al. | 521/79 |
| 5,084,484 | 1/1992 | Nintz et al. | 521/97 |
| 5,162,380 | 10/1992 | Hori et al. | 521/73 |
| 5,223,546 | 6/1993 | Morita | 521/79 |

FOREIGN PATENT DOCUMENTS 1031507  6/1958  Germany .
1226340  3/1971  United Kingdom .

*Primary Examiner*—Morton Foelak
*Attorney, Agent, or Firm*—Joseph C. Gil; Aron Preis

[57] ABSTRACT

The present invention relates to thermoplastic foams in which β-ketocarboxylic acids, β-ketocarboxylic acid esters or tert.-butyl esters of organic acids are used as the foaming agents.

4 Claims, No Drawings

RECYCLABLE THERMOPLASTIC FOAM WITH A HIGH GLASS TRANSITION TEMPERATURE II

The present invention relates to high-temperature resistant thermoplastic foams, and particularly those based on predominantly amorphous thermoplastics, of which polycarbonates, polyesters and polyester (carbonates) are particularly preferred, characterised in that β-ketocarboxylic acids, β-ketocarboxylic acid esters or tert.-butyl esters of organic acids are used as foaming agents, which, even on reextrusion, do not cause any significant reduction in molecular weight and do not produce any undesirable discolouration of the foam. The foams according to the invention are obtained by processing 0.01% by weight to 10% by weight, preferably 0.1% by weight to 8% by weight, and more preferably 0.1% by weight to 5% by weight of a β-ketocarboxylic acid, an ester of β-ketocarboxylic acid or tert.-butyl esters of organic acids with thermoplastics, preferably polycarbonates, polyesters and polyester (carbonates) in an extruder.

Foamed plastics of high molecular weight polycarbonates are known (see for example DE-AS 1 031 507). Suitable foaming agents are for example those which eliminate $CO_2$, or inert gases such as $N_2$ or $CO_2$.

A considerable reduction in molecular weight is however generally observed. The non-volatile decomposition products of the foaming agent remain in the foams.

It is also known that aromatic polycarbonates can only be processed satisfactorily in the completely dry state. Any moisture contained in such polycarbonates leads to a reduction in molecular weight and the formation of bubbles during processing (cf. Plastics Technology 10, 1964, pp. 32 to 36, GP-PS 841 652).

The problem therefore consisted in developing a finely pored foam which undergoes no reduction or only a slight reduction in molecular weight during reextrusion, and possible refoaming. This problem was solved with the β-ketocarboxylic acids, β-ketocarboxylic acid esters or tert.-butyl esters of organic acids according to the invention.

The invention therefore relates to high-temperature resistant thermoplastic foams, and particularly those based on predominantly amorphous thermoplastics, of which aromatic polycarbonates, aromatic polyesters and aromatic polyester carbonates are particularly preferred, and which are characterised in that β-ketocarboxylic acids, β-ketocarboxylic acid esters or tert.-butyl esters of organic acids or mixtures thereof, and more preferably tert.-butyl esters of β-ketocarboxylic acids, are employed as the foaming agents, in quantities of 0.01% by weight to 10% by weight, preferably 0.1% by weight to 8% by weight, and more preferably 0.1% by weight to 5% by weight.

The present invention also relates to a process for foaming high-temperature resistant thermoplastics, which is characterised in that the thermoplastics are mixed with the foaming agents according to the invention in the quantities according to the invention, and the resulting mixtures are either extruded to produce foamed mouldings in an extruder at temperatures of 220° C. to 380° C. without the application of a vacuum or are injection-moulded to produce foamed mouldings in injection-moulding machines at temperatures of 220° C. to 380° C.

Particularly preferred high-temperature resistant thermoplastics are aromatic polycarbonates, aromatic polyesters and aromatic polyester carbonates.

According to the present invention high-temperature resistant denotes glass transition temperatures of $\geq 120°$ C.

High-temperature resistant thermoplastics used for foaming are those which are predominantly amorphous or transparent, such as for example transparent polyamides of the kind which—without implying any limitations—are produced from adipic acid and hexamethylenediamine together with other carboxylic acids such as tere-/iso-/phthalic acid and/or dimeric fatty acids; polyether sulphones, polysulphones and polyether ketones based on 4,4'-dichlorodiphenylsulphone or 4,4-difluorobenzophenone and one or more of the aromatic dihydroxy compounds mentioned as possible polycarbonate components, provided the corresponding polymer is amorphous; as well as, in particular, aromatic polycarbonates, aromatic polyesters and aromatic polyester carbonates and block copolymers thereof containing siloxanes or dimeric fatty acids.

Thermoplastic aromatic polycarbonates according to the present invention are polycarbonates which have been produced by the customary methods described in the literature, from diphenols and carbonate donors (see for example H. Schnell, Chemistry and Physics of Polycarbonates, Interscience Publishers, New York, 1964, U.S. Pat. No. 3,028,365 and German Offenlegungsschrift 3 832 396 (Le A 26 344)).

Diphenols for such polycarbonates can be for example hydroquinone, resorcinol, dihydroxydiphenyls, bis(-hydroxyphenyl) alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl) diisopropylbenzenes, as well as their ring-alkylated and ring-halogenated compounds.

Preferred diphenols are for example 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl) -2-methylbutane, 1,1-bis(3,5-dimethyl-4-hydroxyphenyl)-p-diisopropylbenzene, 2,2-bis(3,5-dichloro-4-hydroxyphenyl)propane, 2,2-bis (3,5-dibromo-4-hydroxyphenyl) propane and 1,1-bis(4-hydroxyphenyl)-3,3,5-trimethylcyclohexane.

Particularly preferred diphenols are for example 2,2-bis(4-hydroxyphenylpropane), 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl) cyclohexane and 1,1-bis(4-hydroxyphenyl)-3,3,5-trimethylcyclohexane.

The diphenols can be used both individually and as mixtures with one another; thus both homopolycarbonates and copolycarbonates can be used. The diphenols are known from the literature or can be produced by processes known from the literature.

It is also possible to use small quantities, preferably quantities of between 0.05 and 2.0 mol %, based on the moles of diphenols employed, of tri- or higher than trifunctional compounds, and in particular those containing three or more than three phenolic hydroxyl groups. Some of the compounds containing three or more than three phenolic hydroxyl groups which can be used are for example:

phloroglucinol, 4,6-dimethyl-2,4,6-tri(4-hydroxyphenyl)-heptane-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(3,4-dihydroxyphenyl)propane, hexa[4-(4-hydroxyphenyl-isopropyl)-phenyl]orthoterephthalic acid ester, tetra(4-hydroxyphenyl)methane, tetra[4-(4-hydroxyphenyl-isopropyl)-phenoxy]methane and 1,4-bis(4',4''-dihydroxytriphenyl)methylbenzene.

Other suitable branching agents are 2,4-dihydroxybenzoic acid and chlorides thereof, trimesic acid and chlorides thereof, cyanuric chloride and 3,3-bis(3-methyl-4-hydroxyphenyl)-2-oxo-2,3-dihydroindole.

The 0.05 to 2 mol %, based on the diphenols employed, of branching agents optionally to be used can either be initially introduced with the diphenols themselves and the molecular weight regulators in the aqueous alkaline phase, or dissolved in an organic solvent, prior to phosgenation.

Suitable molecular weight regulators are those already known, preferably monophenols.

The aromatic polycarbonates according to the present invention should have weight average molecular weights Mw (determined by means of gel permeation chromatography) of between 12,000 and 50,000, and preferably between 15,000 and 35,000.

The solution viscosities are accordingly between 1.15 and 1.35, measured in dichloromethane (0.5 g/100 ml).

Aromatic dicarboxylic acids suitable for the production of the thermoplastic aromatic polyester carbonates are for example orthophthalic acid, terephthalic acid, isophthalic acid, tert.-butylisophthalic acid, 3,3'-diphenyldicarboxylic acid, 4,4'-diphenyldicarboxylic acid, 4,4'-diphenyl ether dicarboxylic acid, 4,4'-benzophenonedicarboxylic acid, 3,4'-benzophenonedicarboxylic acid, 4,4'-diphenylsulphonedicarboxylic acid, 2,2-bis-(4-carboxyphenyl)-propane and trimethyl-3-phenylindane-4,5'-dicarboxylic acid.

Of the aromatic dicarboxylic acids, terephthalic acid and/or isophthalic acid are particularly preferably employed.

Suitable diphenols are those mentioned above for the production of polycarbonates.

The same applies to the branching agents and the monophenolic chain terminators, although it is also possible to use aromatic monocarboxylic acids, such as for example in the form of their acid chlorides or esters.

The carbonic acid can be incorporated into the polyester carbonates either via $COCl_2$ or via diphenyl carbonate, depending on the production process employed, i.e. depending on whether phase interface polycondensation or melt transesterification is used for the production of the polyester carbonates.

The same applies to the aromatic dicarboxylic acids; they are used either in the form of aromatic dicarboxylic acid dichlorides in the two-phase interface process or in the form of dicarboxylic acid diesters in the melt transesterification process. The same applies if monocarboxylic acids are used as chain terminators.

The polyester carbonates to be foamed according to the invention can be produced by known production methods, i.e. as already mentioned, such as for example by the phase interface process or the melt transesterification process.

The polyester (carbonates) to be foamed can thus be either linear or branched in the known manner.

The aromatic polyester (carbonates) according to the present invention have average weight average molecular weights Mw (determined by means of gel permeation chromatography) of between 12,000 and 50,000, and preferably between 15,000 and 35,000. The solution viscosities are accordingly between 1.15 and 1.35, as measured in dichloromethane (0.5 g/100 ml).

The molar quantity of carbonate units in relation to aromatic dicarboxylate units in the polyester (carbonates) to be foamed according to the invention is between 0 and 95 mol %, based on the sum of carbonate and ester units, and preferably between 0 and 80 mol % and more preferably between 0 and 70 mol %.

Thermoplastic aromatic polyesters according to the present invention are the products obtained from the abovementioned dicarboxylic acids, diphenols, chain terminators and, where appropriate, branching agents, without carbonic acid derivatives, and which therefore contain 0 mol % of carbonate units. Their production is known from the literature. The molecular weights and solution viscosities correspond to those of the abovementioned polyester carbonates.

Foaming agents to be used according to the invention are β-ketocarboxylic acids, such as for example malonic acid, acetonedicarboxylic acid, cyclopentanone-2,5-dicarboxylic acid, cyclohexanone-2,6-dicarboxylic acid, 1,4-cyclohexanedione-2,5-dicarboxylic acid, as well as their methyl, ethyl, propyl, butyl, i-butyl, tert.-butyl, amyl, benzyl, phenyl semi- or di-esters; in addition β-ketocarboxylic acids such as acetoacetic acid, benzoylacetic acid, cyclopentanone-2-carboxylic acid, cyclohexanone-2-carboxylic acid, as well as their methyl, ethyl, propyl, butyl, i-butyl, tert.-butyl, amyl, benzyl, and phenyl esters; as well as tert.-butyl esters of organic acids or dicarboxylic acids, such as for example carbonic acid di-tert.-butyl ester, dicarbonic acid di-tert.-butyl ester, acetic acid tert.-butyl ester, succinic acid di- or mono-tert.-butyl ester, oxalic acid di- and mono-tert.-butyl ester, pyruvic acid tert.-butyl ester, phenylacetic acid tert.-butyl ester, benzoic acid tert.-butyl ester, formic acid tert.-butyl ester.

Acetoacetic acid, cyclohexanone-2-carboxylic acid, 1,4-cyclohexanedione-2,6-dicarboxylic acids and their esters are preferred.

The tert-butyl esters of acetoacetic acid, cyclohexane-2-carboxylic acid and 1,4-cyclohexanediol-2,6-dicarboxylic acid are particularly preferred.

The foaming agents can be used individually or in the form of mixtures, and in quantities of 0.01% by weight to 10% by weight, preferably 0.05 to 8% by weight, and more preferably 0.1 to 5% by weight, based on the thermoplastics to be foamed.

The foaming according to the invention can also be carried out using additives customary for the production of foams, such as reinforcing materials, such as for example glass fibres, fillers and/or nucleating agents and/or flameproofing agents and/or mould release agents and/or lubricants and/or flow auxiliaries and/or dyestuffs and/or pigments, such as for example rutile or carbon black and/or stabilisers against heat, UV radiation and humidity.

Customary additives of the kind which can be added to the foams according to the invention are in particular flameproofing additives, such as for example salts of fluorinated or perfluorinated $C_{1-12}$ carboxylic acids, preferably fluorinated or perfluorinated $C_{1-6}$ carboxylic acids, the alkali metal salts, and in particular the sodium and potassium salts being preferred. The salts of aliphatic or aromatic, optionally substituted sulphonic acids can also be used, or even ammonium or phosphonium salts, phosphates, phosphites and polyphosphonates. Other flameproofing agents suitable for the thermoplastic foams according to the invention are brominated and/or chlorinated organic compounds, such as chlorinated or brominated phthalimides, bisphthalimides, diphenyl ethers, bisphenols, oligomeric polycarbonates or chlorinated or brominated bisphenols and fluorinated polyolefins, such as for example polytetrafluoroethylene, including the copolymers known from the literature, finely divided types in types coprecipitated with ABS being preferred. Inorganic salts, such as cryolites, NaCl, $Na_2SO_4$ etc., can also be used as flameproofing agents for the foams according to the invention, cryolites with a fine particle size distribution being preferred.

All of these flameproofing agents can be used either individually or in combination with others, in quantities of 0.005 to 10% by weight, and preferably 0.01 to 5% by weight.

The present invention thus also relates to the foaming of high-temperature resistant thermoplastics having a content of customary additives, which is characterised in that after adding the customary additives the thermoplastics are mixed with the foaming agents according to the invention and the mixtures are either extruded in an extruder at temperatures of 220° C. to 380° C. without the application of a vacuum or they are injection-moulded in injection-moulding machines at temperatures of 220° C. to 380° C. to produce foamed mouldings.

Particularly preferred high-temperature resistant thermoplastics are aromatic polycarbonates, aromatic polyesters and aromatic polyester carbonates.

The present invention also relates to the high-temperature resistant additive-containing thermoplastic foams, preferably polycarbonate foams, polyester foams and polyester carbonate foams obtainable according to the present invention.

In particular, by using silicic acid, aluminium oxides or other pulverulent additives of the kind frequently employed as nucleating agents, free-flowing, easily dosed mixtures can be obtained from liquid foaming agents.

The present invention thus also relates to high-temperature resistant thermoplastic foams which are characterised in that the foaming agents according to the invention are used in combination with pulverulent additives.

The present invention thus also relates to an additional part of the process according to the invention, which is characterised in that the foaming agents according to the invention are used in combination with pulverulent additives.

The quantity of pulverulent additives is between a quantity equal to and a quantity twice that of the foaming agents employed in each case.

A further possible variation of the process according to the invention is the addition of other, low-melting thermoplastics, preferably thermoplastic polyalkylene terephthalates, ABS polymers, SAN polymers and polyolefins, to the high-temperature resistant thermoplastics, in particular the polycarbonates or the polyester carbonates or the polyesters to be foamed, in quantities of up to 100% by weight, based in each case on the weight of the polycarbonate.

The foaming process is not impeded by the presence of these other thermoplastics.

Known impact strength modifiers, such as for example hydrogenated butadiene/styrene copolymers or acrylate graft rubbers can be added to the polycarbonates to be foamed according to the invention, in the customary quantities, and preferably in quantities of up to 10% by weight, based on the weight of the polycarbonate.

Thermoplastic polyalkylene terephthalates also to be used according to the invention are for example those based on ethylene glycol, propane-1,3-diol, butane-1,4-diol, hexane-1,6-diol and 1,4-bis-hydroxymethylcyclohexane. The molecular weights (Mw) of these polyalkylene glycol terephthalates are between 10,000 and 80,000. The polyalkylene glycol terephthalates can be obtained by known processes, for example from terephthalic acid dialkyl ester and the corresponding diol, by transesterification. For example, a lower alkyl ester of terephthalic acid, preferably the dimethyl ester, is used and is esterified with an excess of diol in the presence of suitable catalysts to produce the bishydroxyalkyl ester of terephthalic acid. The starting temperature of 140° C. is increased to from 210° C. to 220° C. The alcohol liberated is distilled off. The condensation is then carried out at temperatures of from 210° C. to 280° C., during which the pressure is decreased gradually to below 1 mm Hg, the excess diol being distilled off.

Thermoplastic ABS polymers also to be used according to the invention are those in which either a monomer from the series comprising styrene, methyl methacrylate or a monomer mixture of 95 to 50% by weight of styrene, α-methylstyrene, methyl methacrylate or mixtures thereof and 5 to 50% by weight of acrylonitrile, methyl methacrylate, maleic anhydride, N-substituted maleimides or mixtures thereof are graft-polymerised onto a rubber. Suitable rubbers are in particular polybutadiene, butadiene/styrene copolymers containing up to 30% by weight of copolymerised styrene, copolymers of butadiene and acrylonitrile containing up to 20% by weight of acrylonitrile or copolymers of butadiene with up to 20% by weight of a lower alkyl ester of acrylic or methacrylic acid (e.g. methyl acrylate, ethyl acrylate, methyl methacrylate and ethyl methacrylate).

The graft copolymers contain 5 to 80% by weight, in particular 20 to 70% by weight of rubber and 95 to 20% by weight, and in particular 80 to 30% by weight of graft-copolymerised monomers. The rubbers are contained in these graft copolymers in the form of at least partially cross-linked particles having an average particle size of 0.09 to 5 μm, and in particular from 0.1 to 1 μm. Such graft copolymers are produced by free-radical graft copolymerisation of monomers from the series comprising styrene, α-methylstyrene, acrylonitrile, methyl methacrylate and maleic anhydride, in the presence of the rubbers to be grafted and they are all known. Preferred processes for the production of such graft copolymers are emulsion, solution, bulk or suspension polymerisation.

Thermoplastic SAN polymers to be used according to the invention are copolymers of 95 to 50 parts by weight of styrene, α-methyl styrene, methyl methacrylate or mixtures thereof and 5 to 50 parts by weight of acrylonitrile, methacrylonitrile, methyl methacrylate or mixtures thereof. These copolymers are particularly preferably products of about 80 to 60% by weight of styrene, and 20 to 40% by weight of acrylonitrile, as well as the analogous copolymers of α-methylstyrene.

Thermoplastic polyolefins to be used according to the invention are polymers of aliphatic, unsaturated hydrocarbons, such as for example ethylene, propylene, butylene or isobutylene, which are obtained by customary processes, such as for example free-radical polymerisation and have average weight averages or molecular weights Mw (measured by gel-chromatographic methods) of between 1,000 and 3,000,000. Both high pressure polyolefin and low pressure polyolefin can be used. The unsaturated hydrocarbons can also be copolymerised in known manner with other vinyl monomers, such as for example vinyl acetate.

The prior mixing of the individual components, i.e. of the high-temperature resistant thermoplastics, preferably the polycarbonates, with the foaming agents, customary additives, other thermoplastics and/or optionally with impact strength modifiers, can be carried out in known manner at room temperature.

The foaming according to the invention is then carried out in the customary machines.

The foams obtainable according to the invention can be moulded to produce any desired mouldings or can be cut as required after foaming.

The foam mouldings obtainable according to the invention can be advantageously used as mouldings for the production of large covers for lamps, housings, office machines or for the production of large cupboard units.

EXAMPLES

Example 1

200 g BPA-polycarbonate ($\eta_{rel}=1.295$) are extruded together with 1% acetoacetic acid tert.-butyl ester and 1% silicic acid at 230° C. A colourless foam with a density of a $\sigma=0.41$ g/cm$^3$ was obtained. The relative viscosity was $\eta_{rel}=1.285$. This foam was chopped and
a) reextruded: polycarbonate with a relative viscosity of $\eta_{rel}=1.282$ is obtained
b) reextruded and again extruded with 1% acetoacetic acid tert.-butyl ester and 1% silicic acid at 230° C.

A colourless foam with a density of $\sigma=0.46$ g/cm$^3$ was obtained. The relative viscosity was $\eta_{rel}=1.285$.

Example 2

200 g BPA-polycarbonate ($\eta_{rel}=1.295$) are extruded together with 1% by weight acetoacetic acid tert.-butyl ester and 2% silicic acid at 230° C. A colourless foam with a density of $\sigma=0.46$ g/cm was obtained. The relative viscosity was $\eta=1.289$.

Example 3

300 g BPA-polycarbonate ($\eta=1.295$) are extruded together with 1.0% by weight acetoacetic acid tert.-butyl ester and 4% silicic acid at 300° C. A colourless foam with a density of $\sigma=0.44$ g/cm was obtained. The relative viscosity was $\eta=1.282$.

Example 4

200 g BPA-polycarbonate ($\eta=1.295$) are extruded together with 2.0% by weight acetoacetic acid tert.-butyl ester and 4% silicic acid at 260° C. A colourless foam with a density of $\sigma=0.44$ g/cm was obtained. The relative viscosity was $\eta=1.282$.

Example 5

200 g BPA-polyester ($\eta_{rel}=1.295$) are extruded together with 1.0% by weight acetoacetic acid ethyl ester and 2% silicic acid at 230° C. A colourless foam with a density of $\sigma=0.63$ g/cm was obtained. The relative viscosity was $\eta=1.284$.

Example 6

200 g BPA-polycarbonate ($\eta=1.295$) are extruded together with 0.5% by weight cyclohexanone 2-carboxylic acid ethyl ester and 2% silicic acid at 260° C. A colourless foam with a density of $\sigma=0.59$ g/cm was obtained. The relative viscosity was $\eta=1.297$.

Example 7

200 g BPA-polycarbonate ($\eta=1.295$) are extruded together with 1.0% by weight cyclohexanone 2-carboxylic acid ethyl ester and 4% silicic acid at 260° C. A colourless foam with a density of $\sigma=0.49$ g/cm$^3$ was obtained. The relative viscosity was $\eta=1.293$.

Example 8

200 g BPA-polycarbonate ($\eta=1.295$) were extruded together with 1% malonic acid, 1% of acidic aluminium oxide and 0.1% pentaerythritol tetrastearate at 260° C. A slightly yellow-tinged foam with a density of $\sigma=0.43$ g/cm$^3$ was obtained. The relative viscosity was 1.271.

Example 9

200 g BPA-polycarbonate ($\eta=1.295$) were extruded together with 0.5% by weight di-tert.-butyl dicarbonate at 260° C. A colourless foam with a density of 0.46 g/cm$^3$ was obtained. The relative viscosity was 1.277.

Example 10

100 g BPA-polycarbonate ($\eta=1.295$) were extruded together with 2% tert.-butyl acetate and 4% silicic acid at 260° C. A colourless foam with a density of 0.88 g/cm$^3$ was obtained.

We claim:
1. A process for foaming a high temperature thermoplastic resin selected from the group consisting of aromatic polycarbonate, aromatic polyester and aromatic polyester carbonate characterized in that said resin is mixed with tert.butyl ester of β-ketocarboxylic acid in a quantity of 0.01 to 10% by weight and the resulting mixture is either extruded without the application of vacuum at a temperature of 220° to 380° C. to produce a foamed molding, or injection molded at 220° to 380° C. to produce a foamed molding.

2. Process according to claim 1, characterised in that, after adding the customary additives to the thermoplastics they are mixed with the foaming agents according to the invention and then extruded or injection-moulded.

3. Process according to claim 1, characterised in that the foaming agents according to the invention are used in combination with pulverulent additives.

4. A process for foaming a high temperature thermoplastic resin selected from the group consisting of aromatic polycarbonate, aromatic polyester and aromatic polyester carbonate characterized in that said resin is mixed with acetoacetic acid tert.-butyl ester in a quantity of 0.01 to 10% by weight and the resulting mixture is either extruded without the application of vacuum at a temperature of 220° to 380° C. to produce a foamed molding, or injection molded at 220° to 380° C. to produce a foamed molding.

* * * * *